E. E. GOLD.
COUPLING.
APPLICATION FILED JAN. 21, 1909.

924,608.

Patented June 8, 1909.

WITNESSES:
Fred White
René Bruine

INVENTOR:
Edward E. Gold,
By Attorneys

UNITED STATES PATENT OFFICE.

EDWARD E. GOLD, OF NEW YORK, N. Y.

COUPLING.

No. 924,608.  Specification of Letters Patent.  Patented June 8, 1909.

Original application filed July 6, 1908, Serial No. 442,242. Divided and this application filed January 21, 1909.
Serial No. 473,577.

*To all whom it may concern:*

Be it known that I, EDWARD E. GOLD, a citizen of the United States, residing in the borough of Manhattan, city, county, and State of New York, have invented certain new and useful Improvements in Couplings, of which the following is a specification.

This invention aims to provide certain improvements in couplings especially adapted for use in connection with hose couplers such as are used for connecting flexible hose of train-pipes, this application being a division of my previous application No. 442,242 of July 6, 1908.

The accompanying drawings illustrate an embodiment of the invention.

Figure 1:
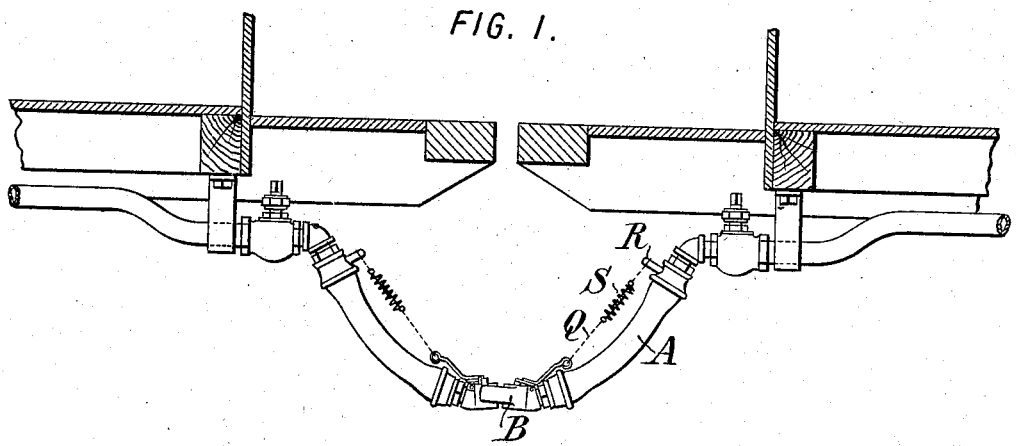
Figure 2:
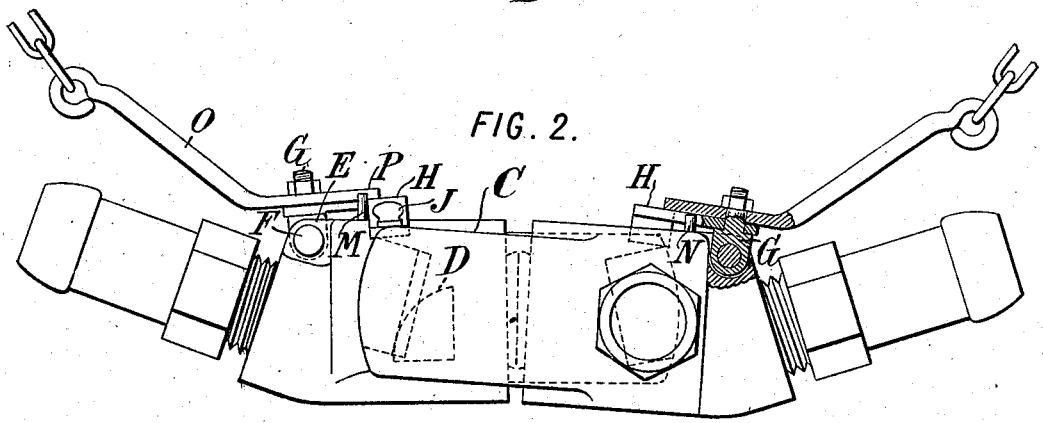
Figure 3:
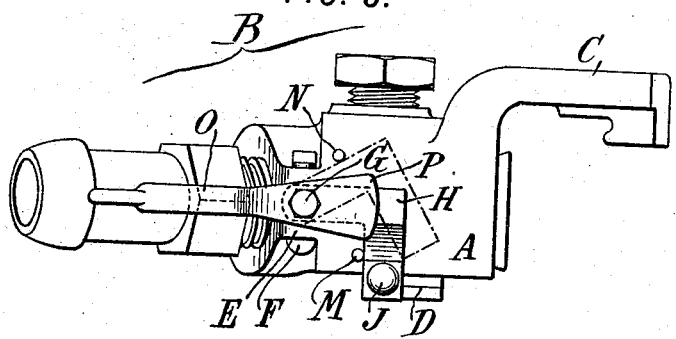

Figure 1 is an elevation of the train pipe and coupled hose with two adjacent cars; Fig. 2 is a similar elevation of a pair of couplers in the coupled position, one of them being partly in section; Fig. 3 is a plan of one of the couplers of Fig. 2.

Referring to the embodiment of the invention illustrated, the hose A carries on its lower end a coupler B of any usual or suitable type adapted to intercouple with the coupler on the adjacent car by hooking an arm C over a flanged projection D on the mating coupler.

Each coupler has a pair of lugs E on the upper part of its neck, between which runs a horizontal pin F forming the pivot of a stud G, upon the upper end of which is pivoted an L-shaped arm H preferably provided with a handle J and having its outer portion adapted to extend over the side of the coupler so as to overlie the arm C of the mating coupler, as shown at the left in Fig. 2, and to lock this arm down in the coupled position. The pivotal movement of the locking member H may be limited by a pair of studs M and N on the top of the coupler.

For holding the locking member H in either its locked or its unlocked position, and for providing at the same time means for reducing the strain on the hose in automatic uncoupling, I provide a lever O, pivoted also on the stud G and having its lower end P overlying the locking member H; and I exert a constant upward pull upon the rear member of the lever O so as to press the forward member P and the locking member H down on the top of the coupler with a sufficient frictional force to prevent accidental movement of the locking member. The pull on the arm O is preferably effected by means of a chain Q fastened to the rear end of the lever and running up to a suitable point of attachment. A convenient point is a lug R on the sleeve of the upper end of the hose. With this position of attachment of the upper end of the chain, it is clear that in an automatic uncoupling operation as the hose A tends to straighten out, there is also a tendency to shorten the chain. A spring S, however, is preferably interposed in the chain so as to take up the difference in length occasioned under the conditions stated, and to still exert some pulling strain upon the couplers, and to that extent to relieve the hose. In the lowered coupled position the chain is at such an angle with respect to the longitudinal axis of the couplers as to exert comparatively little uncoupling effect. But as soon as the uncoupling action commences, the pull of the chain becomes more and more nearly at right angles to the longitudinal axis of the coupler, consequently its pulling effect upon the coupler is greater. The chain may be substituted by a rod or any other connection having the desired supporting or pulling effect.

What I claim is:—

1. A hose coupler having a locking member adapted to be moved to the locking or to the unlocking position, and chain-operated means for holding it impositively in either position to which it is moved.

2. A hose coupler having a locking member adapted to be moved to the locking or to the unlocking position, and a chain-operated lever bearing on said locking member to hold it impositively in either position.

3. A hose coupler having a pivoted locking member H and a pivoted holding lever O the lower end of which engages said locking member to hold it in position, and a chain arranged to exert a lifting force on the upper end of said lever.

In witness whereof, I have hereunto signed my name in the presence of two subscribing witnesses.

EDWARD E. GOLD.

Witnesses:
 DOMINGO A. USINA,
 FRED WHITE.